United States Patent [19]

Senet et al.

[11] 3,966,788

[45] June 29, 1976

[54] PROCESS FOR THE PREPARATION OF ALIPHATIC DIOL POLYCARBONATES

[75] Inventors: Jean-Pierre G. Senet, Vaux-le-Penil; Julien C. Deweerdt, Toulouse, both of France

[73] Assignee: Societe Nationale des Poudres et Explosifs, France

[22] Filed: Sept. 24, 1974

[21] Appl. No.: 508,754

[30] Foreign Application Priority Data

Oct. 16, 1973 France................................ 73.36841

[52] U.S. Cl. .............................................. 260/463
[51] Int. Cl.² ........................................ C07C 68/00
[58] Field of Search ....................................260/463

[56] References Cited
UNITED STATES PATENTS

| | | | |
|---|---|---|---|
| 2,808,371 | 10/1957 | Stevens............................ | 260/463 X |
| 3,046,255 | 7/1962 | Strain et al. ..................... | 260/463 X |
| 3,366,708 | 1/1968 | Magnusson et al............. | 260/463 X |
| 3,544,656 | 12/1970 | Hornung et al................. | 260/463 X |
| 3,544,657 | 12/1970 | Schutze et al. ................. | 260/463 X |
| 3,631,200 | 12/1971 | Nehring et al.................... | 260/463 |

FOREIGN PATENTS OR APPLICATIONS 857,948 7/1949 Germany............................ 260/463

*Primary Examiner*—Joseph Paul Brust
*Attorney, Agent, or Firm*—Bucknam and Archer

[57] ABSTRACT

Hydroxy-telechelating oligomers of number average molecular weight 250 to 2,500 and containing carbonate groups, are prepared by first polycondensing a bischloroformate with a diol at a temperature below 150°C and at a moderately reduced pressure while flushing the reaction mixture with an inert anhydrous gas, and then the oligomers formed are dissolved in a volatile, water-immiscible organic solvent and the solution washed with an aqueous base solution.

In this way, oligomers may be prepared which have a low or zero sensitivity to water, are non-acidic and relatively inexpensive.

16 Claims, 1 Drawing Figure

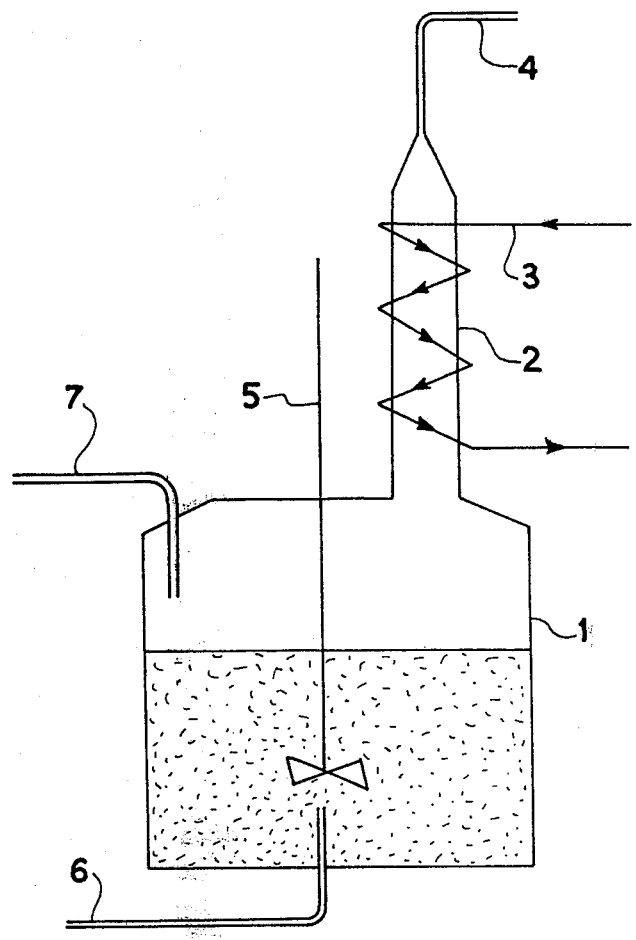

PROCESS FOR THE PREPARATION OF ALIPHATIC DIOL POLYCARBONATES

The present invention relates to an improved process for preparing certain hydroxy-telechelating oligomers which have numerical average molecular weights of between 250 and 2,500 and which possess a number of carbonate groups distributed throughout the macromolecular chain. These oligomers have the following general formula:

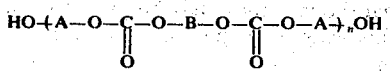

and will be referred to hereafter as "aliphatic diol polycarbonates". In the above formula, A and B represent aliphatic or cycloaliphatic, branched or unbranched radicals which may be the same or different and which may be unsubstituted or substituted by aliphatic or aromatic radicals, halogen atoms or phosphorus-containing groups. The radicals A and B may also contain one or more functional bridges and especially ether, thioether, ester or phosphine oxide bridges.

These aliphatic diol polycarbonates are known. They are prepared by polycondensation of a bis-chloroformate with a diol according to the equation:

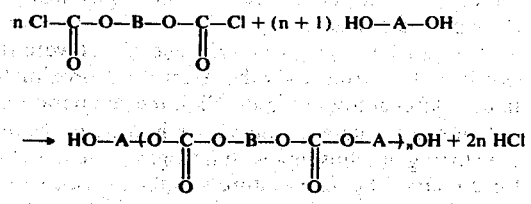

The polycondensation of a chloroformate with a diol is a known reaction which is described in many patent specifications, and in particular in U.S. Pat. No. 3,046,255 and German Pat. No. 857,948. Special precautions are necessary in carrying out this reaction if it is desired to obtain a pure product, because of the large amount of hydrochloric acid liberated. Several attempts to overcome the problems associated with the presence of hydrochloric acid have been made. According to one proposal, a hydrochloric acid acceptor such as a tertiary amine, e.g. pyridine or triethylamine, is included in the reaction mixture and this technique is described in German Pat. No. 118,566. U.S. Pat. No. 2,999,844 describes the use of an alkali metal or alkaline earth metal base to take up the hydrochloric acid.

This approach to the problem was not, however, entirely satisfactory. Tertiary amines are expensive and inorganic bases can be difficult to use (reaction temperature below 0°C, risk of hydrolysis of the chloroformates and precipitation of insoluble salts).

Two other techniques have been devised to overcome the hydrochloric acid problem. In the first of these (French Pat. No. 1,509,851), the reaction is effected at ordinary pressure, and the reaction mixture is flushed with nitrogen so as constantly to remove the hydrochloric acid formed. In the second technique (German Pat. No. 857,948), the reaction is effected under hot conditions and reduced pressure, without flushing with nitrogen.

However, neither of these two techniques completely removes the hydrochloric acid formed. The presence of hydrochloric acid is objectionable because it reacts with the diols to give an alkyl chloride and water which itself reacts with the chloroformate and decomposes it. Since hydrochloric acid acts as a chain interrupter, compounds are obtained which are generally acidic and have less than two functional groups.

We have now devised an improved process for preparing aliphatic diol polycarbonates by which some of the disadvantages associated with prior known procedures are mitigated or overcome. According to the present invention, we provide a process for preparing hydroxy-telechelating oligomers of numerical average molecular weight between 250 and 2,500, which possess a number of carbonate groups distributed through the macromolecular chain, which comprises reacting a bis-chloroformate with a diol in two sequential steps:

1. first polycondensing the bis-chloroformate with the diol at a temperature below 150°C, under reduced pressure, whilst flushing the reaction mixture with a gentle stream of an inert anhydrous gas, and
2. secondly purifying the crude oligomers formed in step (1) by washing a solution thereof in a volatile, water-immiscible organic solvent, with an aqueous base.

In the process of the invention, the reaction temperature is relatively low so as to prevent thermal decarboxylation of the chloroformates which leads to the formation of alkyl chloride end groups. Furthermore, it is desirable if this decarboxylation reaction is to be reduced or prevented to use a pressure which is only moderately reduced, e.g. from 1 to 10 cm of mercury.

The solvent used must be volatile, i.e. it must have a boiling point between 30° and 100°C at 760 mm Hg, and be non-miscible with water. Chlorinated aliphatic solvents in general, and dichloromethane in particular, are very suitable.

The choice of the base to be used in the aqueous solution depends, on the one hand, on the product purity required and, on the other hand, on the use envisaged for the product. Tertiary amines in dilute aqueous solution lead to the best results, but aliphatic diol polycarbonates purified in this way contain traces of amines and this causes the products to show very great reactivity towards isocyanates and has a detrimental effect on their use for preparing mixed polyurethanes.

In some cases, especially in the case of organic solutions of low viscosity, it is advantageous to employ dilute aqueous solutions of bases containing 2 to 15% by weight of an alkaline base (i.e. a basic alkali or alkaline earth metal compound). The purification is then further improved by following this washing process with a washing process employing a dilute solution of ammonia containing active charcoal.

A preferred manner of carrying out the process of the invention will now be described in more detail. There are two methods for introducing the reagents:

Method I: the bis-chloroformate is run into the reactor containing the diol.

Method II: the diol is run into the reactor containing the bis-chloroformate.

The polycondensation reaction (i.e. step (1) of the process) is itself carried out in two stages in a reactor which is equipped with a good reflux condenser and which possesses an efficient stirrer.

In the first stage, one of the monomers is introduced over the course of 2 to 4 hours into the reactor containing the second monomer. The operation is carried out with stirring, at 20° to 80°C and preferably under a reduced pressure of from 1 to 10 cm of mercury, depending on the vapour pressure of the monomers used. Flushing with a gentle stream of anhydrous nitrogen makes it possible to remove the hydrochloric acid.

After introducing the monomer, the temperature and pressure are preferably kept steady for approximately 5 hours.

In the second stage, the temperature is slightly increased (to a maximum of 150°C) for 1 to 2 hours. The stirring, the pressure and the flushing with nitrogen are maintained.

The reaction mixture is allowed to cool to 20° to 30°C and is brought back to atmospheric pressure. A solvent is added in sufficient amount to obtain a fluid solution which can be washed with water.

The solution of the aliphatic diol polycarbonate is washed with its own volume of water. The organic phase is then washed with its own volume of a basic aqueous solution; the washing process must last for a long time (30 to 60 minutes). Preferably, the washing process is carried out at a temperature slightly above ambient temperature.

After drying the solution of aliphatic diol polycarbonate over anhydrous sodium sulphate, the polymer is collected by removing the organic solvent in vacuo. The aliphatic diol polycarbonate can be dried efficiently by heating at 100° to 150°C under reduced pressure.

The following monomers are particularly suitable for use in the process of the present invention:

a. polymethylene glycols HO(CH$_2$)$_n$ and bis-chloroformate derivatives

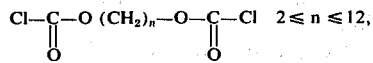

b. diethylene glycol, triethylene glycol, dipropylene glycol and bis-chloroformate derivatives, c. polyoxyethylene glycols, polyoxypropylene glycols of molecular weight less than 800 and bis-chloroformate derivatives, d. thiodiglycol HO(CH$_2$)$_2$ S (CH$_2$)$_2$ OH, and 2,2-dimethylpropane-1,3-diol (neopentyl glycol) and bis-chloroformate derivatives.

This list is not exhaustive. The process can be applied to any diol and any heat-stable bis-chloroformate.

The process according to the invention makes it possible to provide the plastics industry with hydroxytelechelating oligomers which are generally insensitive to hydrolysis, non-acidic and inexpensive. The oligomers are suitable for manufacturing the following compounds, in accordance with conventional processes: thermoplastic elastomeric poly-(carbonate-urethanes) by reaction with a diisocyanate; cross-linked poly-(carbonate-urethanes) by reaction with a triisocyanate or by addition of a triol and reaction of the mixture with a diisocyanate (the products obtained are of great value for paints and varnishes which are exposed to weathering conditions); and flexible or rigid poly-(carbonate-urethane) foams.

It is also possible by the process of the invention to prepare oligomers which do not possess functional groups, by blocking the alcohol groups in accordance with known processes. These oligomers can be used as plasticisers or as lubricants.

Furthermore, because of their transparency and their light-stability, the aliphatic diol polycarbonates prepared by the process of the invention can be used in the synthesis of monomers for organic glasses or transparent glues.

In order that the invention may be more fully understood, the following Examples are given by way of illustration only.

EXAMPLE 1

Diethylene glycol polycarbonate

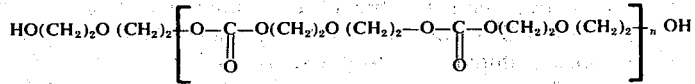

658.3 g (2.85 mols) of diethylene glycol bis-chloroformate were introduced into a 2 liter glass reactor equipped with an efficient stirrer, a thermometer, a dropping funnel, a dip tube and a reflux condenser connected to a vacuum point. The temperature was raised to 60°C, the pressure was lowered to 4.5 cm of mercury and a gentle stream of nitrogen was passed through the dip tube.

355.1 g (3.35 mols) of diethylene glycol were run in slowly, with stirring, over the course of approximately 3 hours. After introducing the diol, the temperature and pressure were kept at the values indicated above and the stirring and flushing with nitrogen were maintained for 2 hours. The temperature was then raised to 120°C for 5 hours, the other working conditions (pressure, stirring and flushing with nitrogen) remaining unchanged.

After this, the reaction mixture was cooled to 5°C, the vacuum was broken, the flushing with nitrogen was stopped and 600 ml of dichloromethane were added. The solution obtained was washed once with 1.5 liters of water and then once with 2 liters of a solution containing 5% of triethylamine in water.

The solution of the diol polycarbonate in dichloromethane was then washed with pure water until it was neutral, and was dried over anhydrous sodium sulphate.

After removing the solvent in vacuo, a colourless and viscous liquid possessing the following characteristics was obtained:

OH content : 1.18 eq/kg
Residual acidity and hydrolysable chlorine content : 0
Water content : 0.3%
Density at 25°C : 1.35 g/cm$^3$
Viscosity at 25°C : 6 × 10$^4$ cp, (centipoise).

The numerical average molecular weight (represented by the sign $\overline{Mn}$), evaluated by gel permeation chromatography (substantially equal to 1,650) was very close to that deduced from the OH content (substantially equal to 1,695), assuming the number of functional groups to be equal to 2, which demonstrated that the process according to the invention made it possible to produce compounds with a number of functional groups very close to 2.

In fact, the numerical average molecular weight $\overline{Mn}$ is defined as being the ratio of the total weight of the macromolecules to their number. If the number of molecules of molecular weight $Mi$ in a sample of polymer is denoted by $ni$, the following relationship applies:

$$\overline{Mn} = \frac{\sum_{i=1}^{\infty} ni \, Mi}{\sum_{i=1}^{\infty} ni}$$

In the case of a hydroxy-telechelating polymer, if $x$ denotes the proportion of OH groups per kg, the following relationship applies, assuming the number of functional groups to be equal to 2:

$$x = \frac{2 \cdot 1{,}000}{\overline{Mn}}$$

or $$\overline{Mn} = \frac{2{,}000}{x}$$

Comparison of the numerical average molecular weight deduced from the proportion of OH groups according to the above formula with the numerical average molecular weight evaluated by gel permeation chromatography (this being a method which does not involve any assumption as to the number of functional groups) thus makes it possible to check whether the number of functional groups of the polymer is indeed close to 2.

EXAMPLE 2

Diethylene glycol polycarbonate, $\overline{Mn} \simeq 1{,}300$

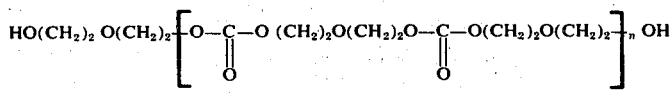

The procedure of Example 1 was repeated, but using 585.2 g (2.54 mols) of diethylene glycol bis-chloroformate and 339.2 g (3.20 mols) of diethylene glycol.

The diol polycarbonate obtained was a colourless liquid possessing the following characteristics:
OH content : 1.56 eq/kg
Residual acidity and hydrolysable chlorine content : 0
Water content : 0.44%
Density at 25°C : 1.34 g/cm³
Viscosity at 25°C : 3 × 10⁴ cp.

EXAMPLE 3

Butande-1,4-diol polycarbonate, $\overline{Mn} \simeq 1{,}450$

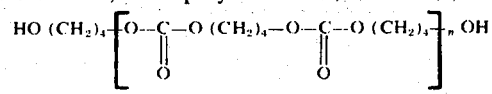

The procedure of Example 1 was repeated but using 516 g (2.4 mols) of butane-1,4-diol bis-chloroformate and 252 g (2.8 mols) of butane-1,4-diol. Also, the washing with a solution of triethylamine was replaced by washing with a 10% strength aqueous solution of sodium hydroxide.

The diol polycarbonate obtained was a white wax which melted at 60°C and possessed the following characteristics:
OH content : 1.38 eq/kg
Residual acidity and hydrolysable chlorine content : 0
Water content : 0.3%

EXAMPLE 4

Polycarbonate of diethylene glycol and butane-1,4-diol, $\overline{Mn}$ 1,600

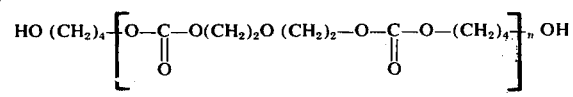

The procedure of Example 1 was repeated, but using 693 g (3 mols) of diethylene glycol bis-chloroformate and 315 g (3.5 mols) of butane-1,4-diol. Also, washing with an aqueous solution of triethylamine was replaced by washing with 5% strength ammonia solution.

A colourless and viscous liquid was obtained, the characteristics of which were as follows:
OH content : 1.17 eq/kg
Residual acidity and hydrolysable chlorine content : 0
Water content : 0.3%.

EXAMPLE 5

Polycarbonate of diethylene glycol and 2,2-dimethylpropane-1,3-diol, $\overline{Mn} \simeq 760$

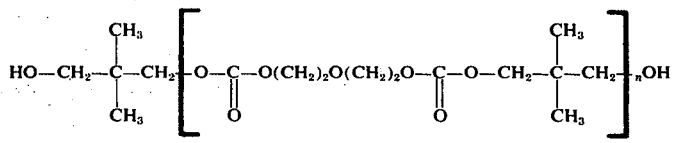

The procedure of Example 1 was repeated, but using 441.2 g (1.91 mols) of diethylene glycol bis-chloroformate and 250.6 g (2.41 mols) of 2,2-dimethylpropane-1,3-diol. The diol was in the reactor and the bis-chloroformate was run in. The same washing solution was used as in Example 1.

A colourless and viscous liquid was obtained which had the following characteristics:
OH content : 2.63 eq/kg
Residual acidity : 0.004 eq. of COOH/kg
Hydrolysable chlorine content : 0
Water content: <0.01%
Density at 25°C : 0.745 g/cm³
Viscosity : 3.4 × 10⁴cp.

EXAMPLE 6

This example illustrates the way in which the process may be carried out in a case where it is necessary to run the bis-chloroformate into the diol because of the physical state of the latter under normal conditions.

The polycarbonate of diethylene glycol and decane-1,10-diol, $\overline{Mn} \simeq 1,000$, was synthesised.

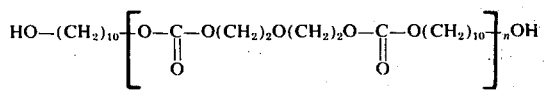

77 g (0.333 mol) of diethylene glycol bis-chloroformate were introduced, with stirring, over the course of approximately twenty minutes, into 78 g (0.45 mol) of decane-1,10-diol.

This addition was carried out at ambient temperature, flushing with nitrogen and under a pressure of 10 cm of mercury. The reaction mixture was then heated at 110°C for 3 hours, the other working conditions remaining unchanged.

The product was recovered and purified in accordance with the process of Example 3 (84 % yield).

The diol polycarbonate obtained possessed the following characteristics:
OH content : 1.98 eq/kg
Hydrolysable chlorine content : 0
Non-hydrolysable chlorine content : 0.23%
$H_2O$ content : 0.17%
Density at 25°C : 1.10 g/cm³.

EXAMPLES 7 to 20

These Examples illustrate the way in which the process according to the invention is carried out on an industrial scale. The installation is shown schematically in the accompanying drawing in which the reactor 1 has a useful volume of 20 liters and is surmounted by a condensation column 2 cooled by means of a cooling system 3 supplied with brine at −10°C, the column having a useful surface area of 1.2 m². An outlet 4 is connected to a vacuum pump. A blade stirrer 5 is provided to ensure that the reaction mixture is homogeneous. The nitrogen feed tube 6 is situated in the bottom of the reactor underneath the stirrer 5 so as to ensure that nitrogen bubbles through the reaction mixture whilst the reagents are introduced via the feed tube 7.

Diethylene glycol polycarbonates, polycarbonates of (diethylene glycol and butane-1,4-diol) and butane-1,4-diol polycarbonates were synthesised using this apparatus.

The working conditions and the results of these syntheses are given in Tables I to III below.

TABLE I

Synthesis of diethylene glycol polycarbonates by reacting diethylene glycol with diethylene glycol bis-chloroformate.

| Example No. | Weight of chloroformate | Weight of diol | Running-in of the diol | | | Reaction | | | Theoretical molecular weight | Molecular weight obtained | Yield |
|---|---|---|---|---|---|---|---|---|---|---|---|
| | | | Duration | Vacuum | Temperature | Duration | Vacuum | Temperature | | | |
| 7 | 6.237 kg | 3.180 kg | 2 hrs | 35 mm Hg | 60°C | 2 hrs | 40 mm | 60°C | 2,500 | 2,266 | 70 % |
| | | | | | | 1 hr | 40 mm | 90°C | | | |
| 8 | 5.560 kg | 2.860 kg | 1 hr 50 mins | 37 mm Hg | 60°C | 2 hrs | 40 mm | 60°C | 2,226 | 2,125 | 74 % |
| | | | | | | 1 hr | 30 mm | 90°C | | | |
| 9 | 5.560 kg | 2.860 kg | 1 hr 55 mins | 25 mm Hg | 60°C | 2 hrs | 30 mm | 60°C | 2,226 | 2,330 | 74 % |
| | | | | | | 1 hr | 30 mm | 90°C | | | |
| 10 | 5.560 kg | 2.860 kg | 2 hrs | 27 mm Hg | 60°C | 2 hrs | 30 mm | 60°C | 2,226 | 2,575 | 74 % |
| | | | | | | 1 hr | 30 mm | 90°C | | | |
| 11 | 5.550 kg | 2.970 kg | 2 hrs | 40 mm Hg | 60°C | 2 hrs | 40 mm | 60°C | 1,696 | 1,790 | 74 % |
| | | | | | | 1 hr | 40 mm | | | | |
| 12 | 5.800 kg | 3.020 kg | 1 hr 45 mins | 60 mm Hg | 60°C | 2 hrs | 50 mm | 60°C | 2,000 | 1,900 | 71 % |
| | | | | | | 1 hr | 25 mm | 90°C | | | |
| 13 | 5.800 kg | 3.000 kg | 2 hrs | 40 mm Hg | 60°C | 2 hrs 30 mins | 35 mm | 60°C | 2,000 | 1,965 | 77 % |
| | | | | | | 1 hr | 20 mm | 90°C | | | |
| 14 | 5.800 kg | 3.020 kg | 1 hr 35 mins | 40 mm Hg | 60°C | 2 hrs 15 mins | 40 mm | 60°C | 2,000 | 1,880 | 80 % |
| | | | | | | 1 hr | 30 mm | 90°C | | | |
| 15 | 5.800 kg | 3.020 kg | 2 hrs | 45 mm Hg | 62°C | 2 hrs 15 mins | 40 mm | 60° C | 2,000 | 1,880 | 78.5% |
| | | | | | | 1 hr | 15 mm | 90°C | | | |

TABLE II

Synthesis of polycarbonates of diethylene glycol and butane-1,4-diol by reacting butane-1,4-diol with diethylene glycol bis-chloroformate

| Example No. | Weight of chloroformate | Weight of diol | Running-in of the diol | | | Reaction | | | Theoretical molecular weight | Molecular weight obtained | Yield |
|---|---|---|---|---|---|---|---|---|---|---|---|
| | | | Duration | Vacuum | Temperature | Duration | Vacuum | Temperature | | | |
| 16 | 6.150 kg | 2.650 kg | 1 hr 55 mins | 35 mm | 60°C | 0 hr | 35 mm | 60°C | 2,300 | 2,380 | 71 % |
| | | | | | | 1 hr 30 mins | 35 mm | 80°C | | | |
| 17 | 6.150 kg | 2.650 kg | 2 hrs 10 mins | 40 mm | 6°C | 0 hr | 40 mm | 60°C | 2,300 | 2,575 | 71 % |
| | | | | | | 1 hr 30 mins | 40 mm | 90°C | | | |

TABLE III

Synthesis of butane-1,4-diol polycarbonates by reacting butane-1,4-diol with butane-1,4-diol bis-chloroformate

| Example No. | Weight of chloro-formate | Weight of diol | Running-in of the diol Duration | Vacuum | Temperature | Reaction Duration | Vacuum | Temperature | Theoretical molecular weight | Molecular weight obtained | Yield |
|---|---|---|---|---|---|---|---|---|---|---|---|
| 18 | 6.120 kg | 2.840 kg | 1 hr | 40 mm | 60°C | 1 hr<br>2 hrs 30 mins | 40 mm | 60°C<br>73°C | 2,300 | 2,080 | 78.5% |
| 19 | 6.120 kg | 2.840 kg | 2 hrs | 40 mm | 60°C | 0 Hr<br>2 hrs 30 mins | 40 mm | 60°C<br>80°C | 2,300 | 2,220 | 78.5% |
| 20 | 6.120 kg | 2.840 kg | 1 hr 55 mins | 55 mm | 60°C | 0 hr<br>2 hrs | 55 mm | 65°C<br>85°C | 2,300 | 2,180 | 78.5% |

Examples 1 to 20 show that it is possible, by means of the process of the invention, to prepare aliphatic diol polycarbonates which possess a number of functional groups substantially equal to 2 and which have a numerical average molecular weight very close to this desired value.

The Examples are given only by way of illustration of some methods of carrying out the process and it is possible to introduce numerous variants therein without in any going outside the spirit of the present invention.

We claim:

1. A process for preparing telechelating oligomers having two terminal hydroxyl groups of numerical average molecular weight between 250 and 2500, which possess carbonate groups distributed through the macromolecular chain, with the repeating unit of structure

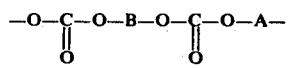

in which each of A and B is branched or straight chain bivalent aliphatic hydrocarbyl or cycloaliphatic hydrocarbyl radical, unsubstituted or substituted by aromatic, halogen or phosphorus-containing groups, or is a branched or straight chain bivalent aliphatic hydrocarbyl or cycloaliphatic hydrocarbyl radical additionally containing at least a functional bridge selected from the group consisting of ether, thioether and ester radicals and A and B are the same or different, which consists of reacting a monomer which is a bis-chloroformate of formula

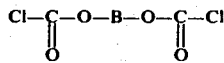

in which B is as defined hereinabove with an excess of a monomer diol of the formula

in which A is as defined hereinabove, in three sequential steps:

1. introducing one of said monomers into the other over a period of 20 minutes up to 4 hours under reduced pressure of 1-10 cm of mercury at a temperature of 20°-80°C while flushing the reaction mixture with a gentle stream of an inert anhydrous gas, and 2. polycondensing the bis-chloroformate with the diol at a temperature below 150°C, under reduced pressure of 1-10 cm of mercury for a period of time between 1.5 hours and 7 hours;

3. and purifying the crude oligomers formed.

2. The process according to claim 1 wherein the crude oligomers formed in step (2) are purified by washing a solution thereof in a volatile water-immiscible organic solvent, with an aqueous base.

3. A process according to claim 1, wherein in step (1) and (2), the inert gas is nitrogen.

4. A process according to claim 2, wherein in step (3), the organic solvent is a chlorinated aliphatic solvent.

5. A process according to claim 4, wherein the organic solvent is dichloromethane.

6. A process according to claim 4, wherein in step (3), the aqueous base is an aqueous solution of a tertiary amine.

7. A process according to claim 4, wherein in step (3), the aqueous base is an aqueous solution of an alkaline base or aqueous ammonia.

8. A process according to claim 2, wherein after washing with an aqueous base, the solution of the oligomers in the organic solvent is washed with a dilute solution of ammonia.

9. A process according to claim 8, wherein active charcoal is included in the dilute solution of ammonia.

10. The process according to claim 1 wherein in said step (2) the temperature is first kept at 20°-80°C for a period of 5 hours and then the temperature is raised up to 150°C for 1-2 hours.

11. The process according to claim 2 wherein said washing in step (3) is carried out at a temperature slightly above ambient temperature.

12. A process according to claim 4 wherein said chlorinated aliphatic solvent which is water-immiscible has a boiling point of from 30° to 100°C.

13. A process according to claim 12 wherein, after step (3), the solution of the oligomers is subjected to a further washing step comprising contacting the solution with a dilute aqueous solution of ammonia containing active charcoal.

14. A process according to claim 1 wherein in step 1) the bis-chloroformate is run into a reactor containing said diol.

15. A process according to claim 1 wherein in step 1) the diol is run into the reactor containing the bis-chloroformate.

16. A process according to claim 1 wherein in step 1) the diol is thiodiglycol.

\* \* \* \* \*